(No Model.)  5 Sheets—Sheet 1.
J. C. HEALD.
HUB TURNING LATHE.

No. 571,901.  Patented Nov. 24, 1896.

Witnesses:  Inventor:
Walter E. Lombard  Joseph C. Heald
M. E. Bonditch  Jer. T. W. Porter Atty (No Model.)
5 Sheets—Sheet 2.

J. C. HEALD.
HUB TURNING LATHE.

No. 571,901.
Patented Nov. 24, 1896.

Witnesses:
Walter E. Lombard.
M. E. Bonditch.

Inventor:
Joseph C. Heald
Per T. W. Porter Atty (No Model.) 5 Sheets—Sheet 3.

J. C. HEALD.
HUB TURNING LATHE.

No. 571,901. Patented Nov. 24, 1896.

Witnesses:
Walter E. Lombard.
M. E. Bonditch.

Inventor:
Joseph C. Heald
fu T. W. Porter Atty.

(No Model.) 5 Sheets—Sheet 4.

J. C. HEALD.
HUB TURNING LATHE.

No. 571,901. Patented Nov. 24, 1896.

Witnesses:
Walter E. Lombard.
M. E. Bonditch

Inventor:
Joseph C. Heald
per T. W. Porter Atty (No Model.) 5 Sheets—Sheet 5.
J. C. HEALD.
HUB TURNING LATHE.
No. 571,901. Patented Nov. 24, 1896.
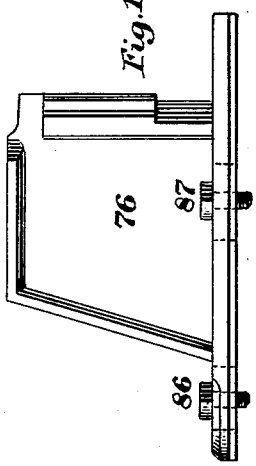
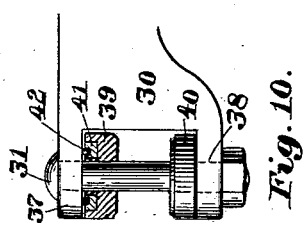
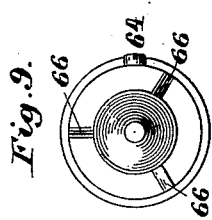
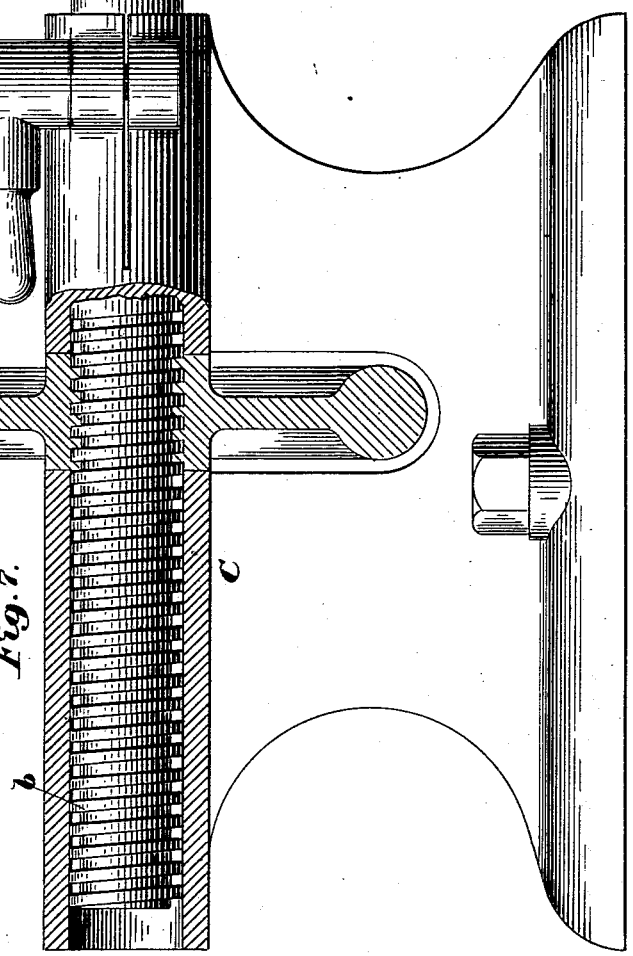
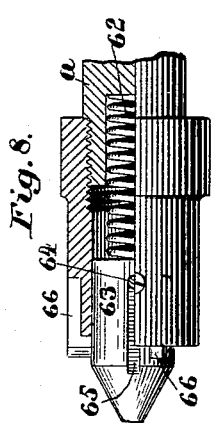
Witnesses:
Walter E. Lombard.
M. E. Bowditch.
Inventor:
Joseph C. Heald
per T. W. Porter Atty

UNITED STATES PATENT OFFICE.

JOSEPH C. HEALD, OF LAWRENCE, MASSACHUSETTS, ASSIGNOR OF ONE-HALF TO ALBERT C. FOWLER, OF SAME PLACE.

HUB-TURNING LATHE.

SPECIFICATION forming part of Letters Patent No. 571,901, dated November 24, 1896.

Application filed November 19, 1895. Serial No. 569,390. (No model.)

*To all whom it may concern:*

Be it known that I, JOSEPH C. HEALD, of Lawrence, in the county of Essex and State of Massachusetts, have invented a new and useful Improvement in Hub-Turning Lathes, which will, in connection with the accompanying drawings, be hereinafter fully described, and specifically defined in the appended claims.

Figure 1:
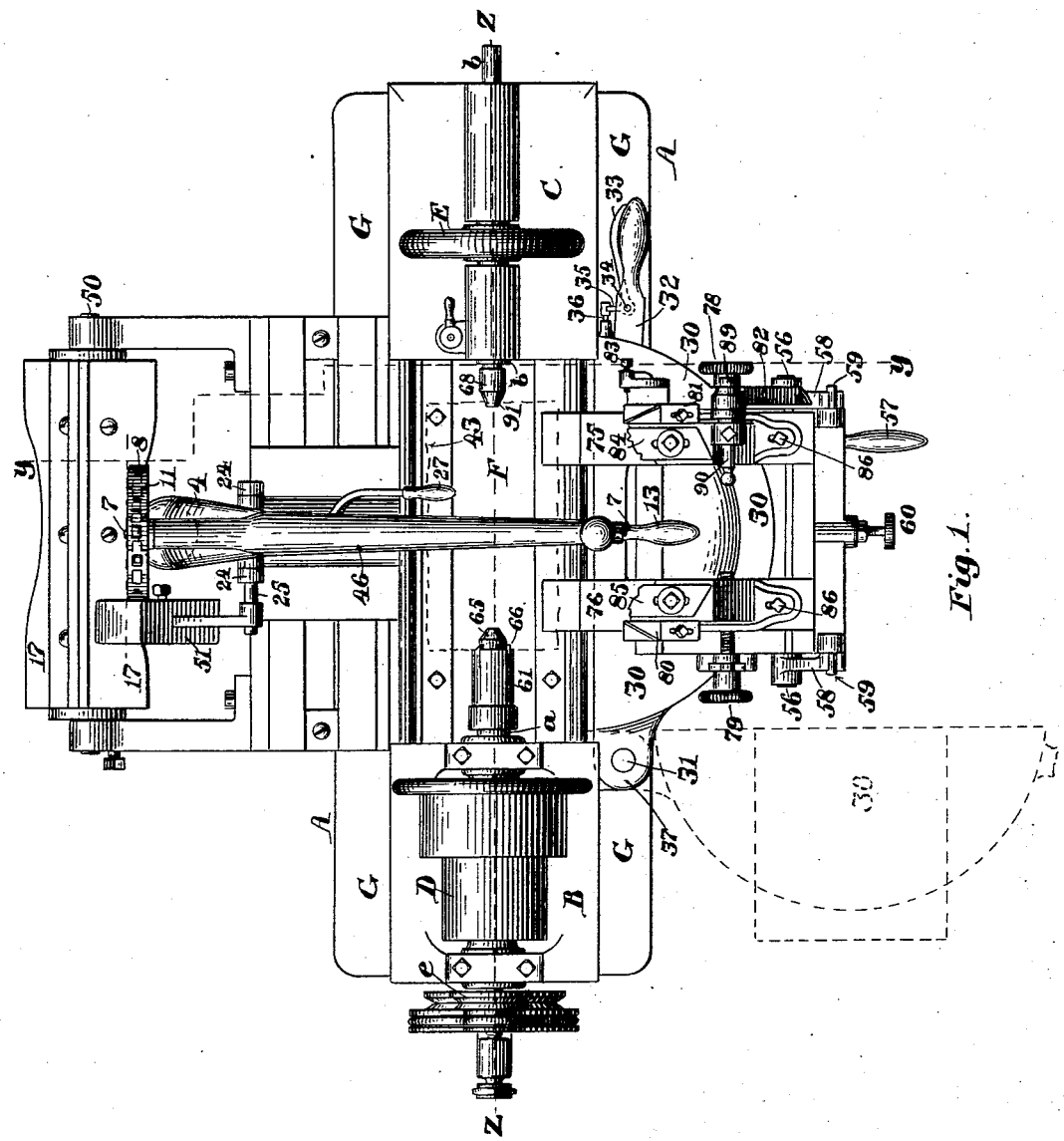
Figure 2:
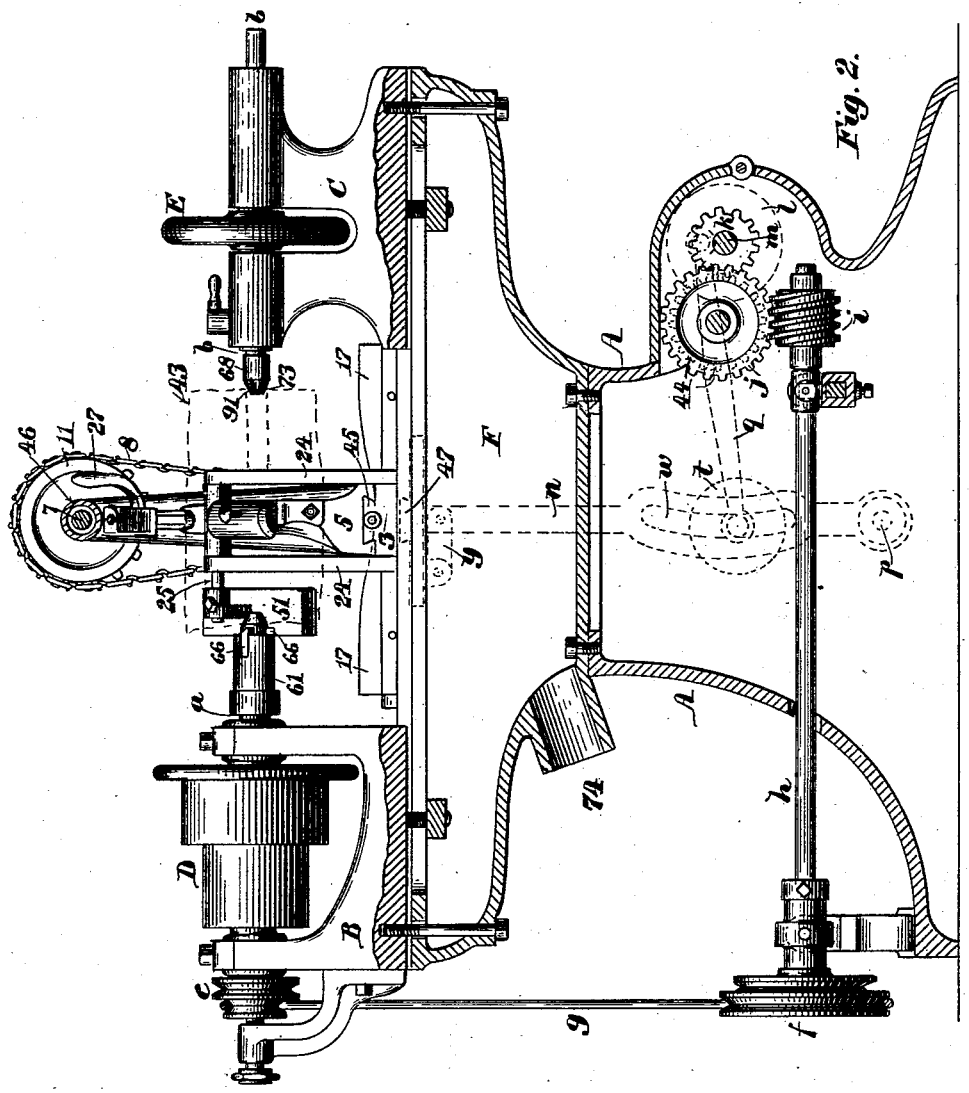
Figure 3:
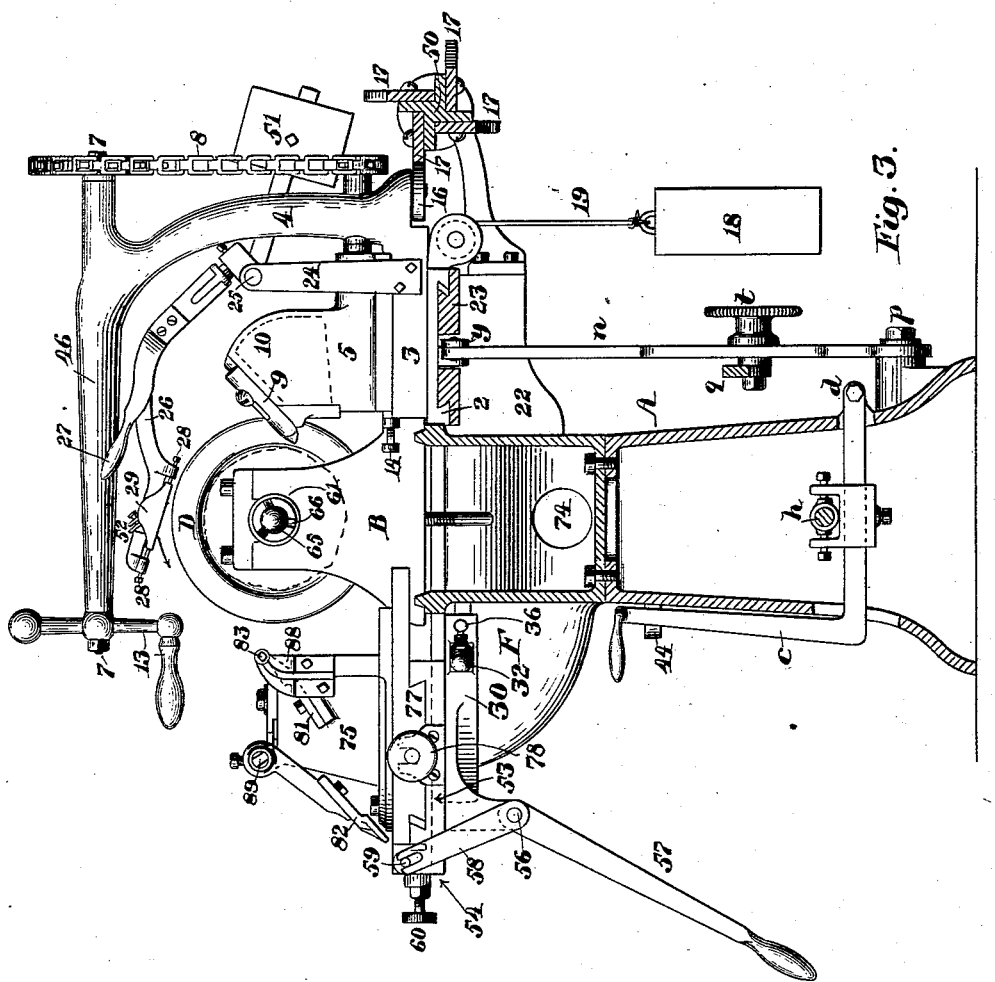
Figures 5, 6:
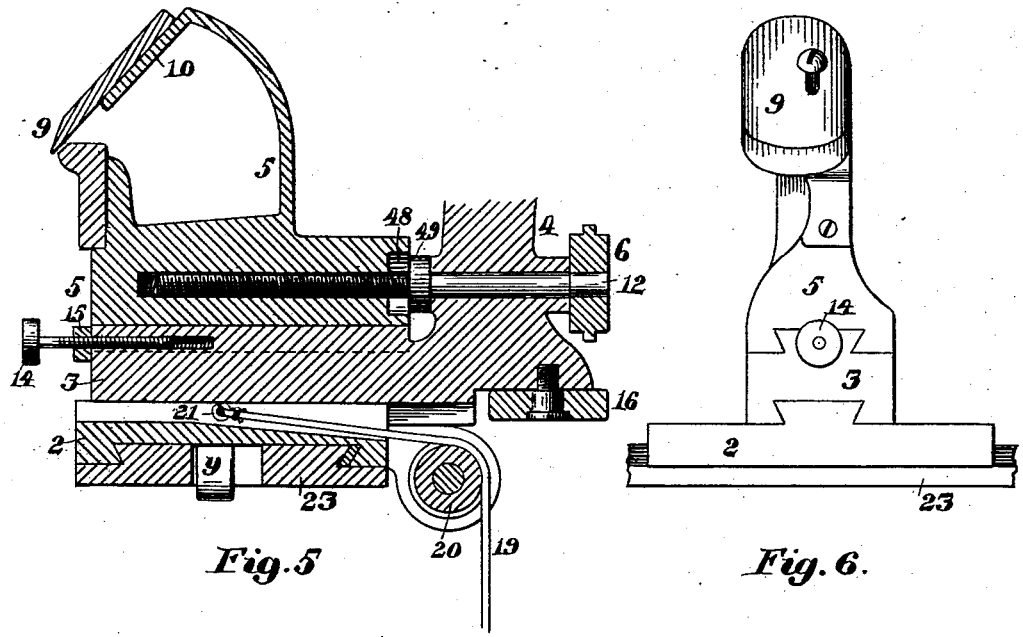
Figure 4:
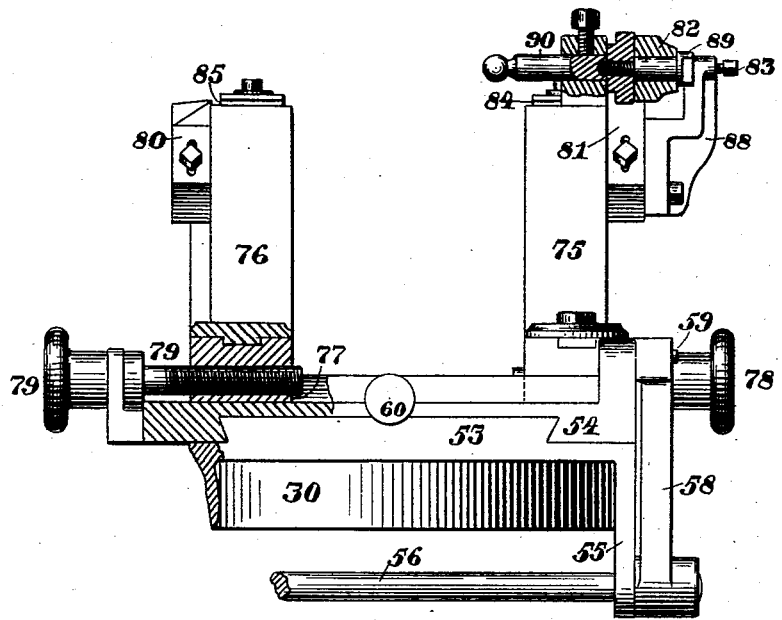

In said drawings, Figure 1 is a top plan view of a machine embodying my invention. Fig. 2 is a vertical section on line Z Z, Fig. 1, the arbors and their bearings being shown in elevation, as they are elsewhere shown enlarged. Fig. 3 is a sectional elevation, the section being taken as on line Y Y, Fig. 1, and the view as from the right in that figure. Fig. 4 is a detached front elevation of the transversely-sliding carriage upon which are mounted certain of the hub-forming cutters. Fig. 5 is a detached vertical section through the roughing-off cutter and coacting parts. Fig. 6 is an elevation taken as at the left of Fig. 5. Fig. 7 is a detached sectional elevation of the tail-stock of the lathe to be described. Figs. 8 and 9 are detached views of parts of the "live" center of the lathe to be described. Fig. 10 is a detached sectional elevation of the hinge on which the front tool-holder swings when access to the tools is required, and Fig. 11 is a detached inside elevation of the tool-carrying post shown at the left in Fig. 4.

The object of this invention is to provide a lathe that will automatically turn all parts of hubs, including the central portion, the diminishing curved portions, the seats for the bands at each end, and the end faces, the lathe being first adjusted to turn any desired style and size of hub, after which the machine will turn any desired number of hubs of the same unvarying size and form; and the invention consists in the several devices and the combinations thereof, as will be next herein described, and then defined in the appended claims.

Referring again to said drawings, A represents the frame or body of the lathe, which may be formed in various ways, but which I prefer to form as an inclosing casting of suitable form, which in its upper part is enlarged, as at F, to form a receptacle for the chips cut by the several tools, said chips after passing into said receptacle being thence drawn by a fan-blast or other draft through outlet 74, Fig. 2, whence they are conveyed to the furnace or other receptacle.

The head-stock is shown at B and the tail-stock at C, each secured upon the girths or "ways" formed at the top of frame A. The usual cone-pulley D is shown upon the "live" arbor $a$ for driving the same by a belt, and a tail-stock spindle is shown at $b$, while a hand-wheel E is threaded upon said spindle, so that by rotation of the wheel the spindle is moved in and out as desired.

The hub-blanks (indicated by dotted lines at 43, Figs. 1 and 2) are irregular in circumferential outline when placed in the lathe, all that has been done to them being to cut them to an approximate length and to bore a central hole through them; and for the purpose of first roughing the blanks to an approximate size and of cylindrical form I employ the following-described means:

Upon live center $a$ is secured the cone-pulley $e$, which drives belt $g$, that drives shaft $h$ by engaging pulley $f$, secured upon it. At the opposite end of shaft $h$ is secured the worm $i$, that engages and rotates tangent-wheel $j$. A spur-gear 44 (shown in dotted lines) is mounted upon and driven by the shaft to which gear $j$ is secured, said gear 44 meshing into and rotating pinion $k$, which drives shaft $m$, on the back end of which is secured a crank-disk $l$, which has an adjustable wrist-pin that engages connecting-rod $q$, that by screw-stud $t$ is locked in slot $w$ in vertical arm $n$, which at $p$ is pivoted to frame A.

The object of elongated slot $w$ in arm $n$, as also of having the wrist-pin or stud in disk $l$ adjustable to or from the shaft $m$, is to give to the tool that roughs off hubs 43 just the necessary stroke to traverse the length of such hubs, as will be hereinafter explained.

Upon brackets 22, projecting from the rear of frame A, is secured the dovetailed piece 23, on which is fitted the slide 2, as shown in Fig. 3, and to said slide the lever $n$ is connected by stirrup $y$, (shown in Figs. 2 and 3,) so that said lever as it vibrates will move said slide lengthwise of the lathe the requisite distance.

A dovetail 47 is formed upon slide 2, and a slide 3 is fitted to said dovetail to move transversely to the lathe, and a standard 4 is formed upon or secured to said slide 3, and the top of said standard supports arm 46, through which passes shaft 7, having at its front end a hand-crank 13, while at its rear end it has a sprocket 11 secured to it. Upon said sprocket is carried chain 8, which at its lower bight engages sprocket 6, Fig. 5, which sprocket is secured upon screw 12, threaded in slide 5 to actuate the same transversely to the lathe. Said slide 5 is mounted upon dovetail 45, formed upon slide 3, as shown in Figs. 2 and 5. A collar 49, formed upon screw 12, serves to hold the same in position when actuating it, and recess 48 in the slide allows the same to move close to said standard. A stop-screw 14, threaded in slide 3 and provided with a lock-nut 15, is arranged to limit the distance to which slide 5 can be moved to the front when roughing off hub-blanks, as stated.

A cutter 9 on arm 10 of slide 5 serves as the means for cutting the hub away to the required extent when roughing it down to an approximate size, and in this operation only slide 5 is moved transversely to the lathe-body by rotating shaft 7, and thereby chain 8 and screw 12, as already explained, and at the same time cutter 9 is by lever $n$ moved to the required distance in the lengthwise direction of the lathe and hub. When it is desired to operate my lathe without such automatic lengthwise movements of parts mounted on slide 2, driven by arm $n$, I disengage screw $i$ from gear $j$ by unlocking angle-lever $c$, Fig. 3, from catch 44 and allowing said lever to swing downward upon its pivot $d$, so that said screw is released from the gear, the bearings of shaft $h$ being mounted upon pivots, as shown in Figs. 2 and 3, to admit of such release.

A multiflanged center 50, mounted upon pivots, is secured directly in rear of slide 3, and to it are secured the outline-pieces 17, of such curvature as it is desired to impart to the main part of the hub.

A truck 16 is pivoted beneath standard 4 and so as to bear against the outline-piece 17, arranged in rear of it, and to maintain such contact of the roll and outline-piece I arrange a weight 18, suspended by cord 19, that passes over sheave 20 and is secured to eye 21, secured in slide 3, so that said slide and all that it supports are held by said weight with said truck in contact with the outline-piece. By this means cutter 9 can cut away the hub, as intended, the slide 5 being limited in its movement by screw 14, as before explained.

After cutting the hub away to the desired extent by cutter 9 I then employ the following means for smoothing it: A shaft 25, pivoted in standard 24, secured to and rising from slide 3, carries an arm or stock 26, that extends to the front over the center of the hub, while at the rear an arm extends from said shaft and carries a weight 51, that tends constantly to raise arm 26. (See Figs. 2 and 3.) A handle 27, attached to arm 26, serves as the means for actuating the latter, and a plane-stock 29, mounted upon pivots 28, threaded in said stock, carries a cutting-tool 52, that smooths the surface of the hub, the operation of lever $n$ in moving slide 2 and parts above it being required whenever any of the rear cutters are in operation.

For the purpose of cutting the end faces, the band-seats, and adjacent parts of the hub, I employ the following means: At the front of the lathe a semicircular piece 30, arranged to cover the front portion of receptacle F, is pivoted to the lathe-frame at pin 31, that passes through ears 37 and 38 of said part 30, and also through ears 39 and 40, formed upon frame A. The pivoting of said part 30 is shown in Fig. 10, the ear 39 being formed with an annular recess in which is seated the annular steel ring 41, having an annular groove in which are arranged a series of steel balls 42 to facilitate the swinging motion of part 30, which will be requisite when the rear cutters are in use, and for other purposes. The position of part 30 and the parts carried by it when thus swung out of use is shown by dotted lines in Fig. 1. A dovetail 53 is formed just above said cover 30 and as part thereof, and a slide 54 is arranged to move thereon. Two arms 55 are formed upon and depend downward from part 53, and a rod 56 is secured in said arms and a hand-lever 57 is rigidly secured thereto, and at each end, outside of arms 55, arms 58 are rigidly secured to said rod 56, while at their upper or swinging ends they are forked and embrace pins 59, secured in part 54, so that the vibration of lever 57 will move part 54 and parts thereby carried back and forth upon dovetail 53, a stop-screw 60 being threaded in slide 50 to regulate and control the inward movement of said slide by the contact of its head with dovetail 53. A piece 77 is formed with a dovetail that moves in a groove in slide 54, (see Fig. 3,) and in said piece is mounted the tool-post 75, secured by screw-bolts 86 and 87, Figs. 1 and 11, which pass through slots in post 75, so that the same can be somewhat adjusted outward and inward, as the diameter of the ends of the hub may render desirable, and by means of adjusting-screw 78 said tool-post can be adjusted to right or left, as may be required. The tool-post 76 at the opposite side of slide 54 is secured upon a dovetail piece like 77, and it is adjusted laterally by screw 79, the parts being broken away to show its engagement. Both posts 75 and 76 are formed with a tongue that enters a rabbet in piece 77 to hold said posts exactly in position.

Upon post 76 is secured the slanting cutting-tool 80 that forms the band-seat at the inner end of the hub when the same is being finished, and upon the top of said post is secured the adjustable cutter 85, which finishes that part of the larger or inner end of the hub that is between said inner band and the part that has been finished by the plane (shown in Fig. 3) at the rear of the machine.

Upon tool-post 75 is secured the slanting tool 81 that cuts the outer band-seat upon the hub. Said cutter, like 80, is adjustable in its position to compensate for wear or other purposes, and upon post 75 is secured the adjustable cutter 84 that forms that part of the outer portion of the hub between the hand-seat and the portion finished by plane 29.

A cutter 82 is pivoted upon an outer stud 89, threaded in stud 90, secured upon post 75. A set-screw 83 in bracket 88 is arranged to hold the forward end of said cutter when it is in the act of cutting away the surplus wood at the end face of the hub. Said cutter is shown as turned to the rear in Fig. 3, as when not in use and as in Fig. 1.

The live-spindle $a$, Fig. 8, has a sleeve 61 threaded upon it, and a spring 62, seated in said spindle and sleeve, tends constantly to force center 63 outward. Said center is limited in its outward movement by screw 64, inserted in sleeve 61 and extending into groove 65, formed in said center.

The dead-spindle $b$ has inserted in it center 67, upon a reduced outer portion of which is mounted the coil-spring 69, that at one end bears against the shoulder of said center and at the other end bears against a hollow cone 68, seated upon center 67. Said cone is in its outward movement limited by screw 70, threaded in said cone, and which enters a groove 71, formed in the center to limit the movement of the cone. Said cone is formed with an axial passage 72, through which the center passes.

The object of the springs in arbor $a$ and cone-center 68 is to impart to them an expansive or outward movement in order that as the end faces of the hub-blank are rendered true by cutting away a portion of the hub the centers will expand and still hold the hub firmly between them. Center 63 will at the base of the cone be of the same size as the hole through the hub, so that spurs 66 will be seated in the solid wood adjacent to such hole, while center 68 will but partially enter said hole and by bearing against the orifice thereof will hold the hub in contact with spurs 66. A recess or seat 91 is formed in the outer oblique face of cone 68, into which the edge or cutting end of cutter 82 can enter when cutting the end face of the hub without injury to the tool.

For the purpose of locking and unlocking part 30 and the parts mounted thereon a rigid handle 32, Fig. 1, extends from part 30, and a hinged part of said handle is shown at 33, hinged at 34, and from said pivotal hinge 34 a rigid arm 35 extends, to which is attached a pin 36, that enters a hole in frame A, thereby locking part 30 in place, while the pressure upon part 33 will force it into line with handle 32, thereby withdrawing said pin and unlocking part 30.

A spring may be arranged to hold part 33 out of line with 32 to thereby hold 30 locked, as shown in Figs. 1 and 3.

Having thus described my invention, what I claim as new, and desire to secure by Letters Patent, is—

1. In a hub-turning lathe, the frame or bed A deepened in the central portion as shown and in said central portion extended to the front as indicated at part F, and having a cover 30, arranged above said part that so projects to the front of the main line of said frame, and an escape-tube 74 by which the refuse that enters said enlargement may be drawn and delivered therefrom for the purposes specified.

2. In a hub-turning lathe, and in combination with slide 2 arranged to be reciprocated in the longitudinal line of the lathe, standard 4 of slide 3, having arm 46 with shaft 7 mounted thereon and provided at front with a hand-crank and at the rear carrying sprocket 11, a shaft 12 carrying sprocket 6 and threaded in slide 5: and a cutter 9 secured to arm 10 of slide 5, all so arranged that said cutter will traverse the length of the hub while it can be actuated transversely thereto as specified.

3. In a hub-turning lathe the combination of the following instrumentalities, to wit, a supporting-frame, a head-stock and adjustable tail-stock mounted on said frame and constructed and arranged to operate as specified: a cutter as 9 duly connected with a hand-actuated arm 46, and suitable mechanism by which said cutter traverses both the length of the hub and is adjusted to the diameter thereof; a hub-former mounted in rear of the lathe and arranged to limit the position of said cutter 9 as specified: a shaft as $h$ driven from said head-stock and by gears and pitman arranged through vibrating lever $n$ to impart to the cutter 9 through standard 4 a reciprocating movement the length of the hub, a cutter-stock as 29, carried by means like cutter 9 actuated by lever 27 and arranged at the front of the machine to finish the surface of the hub, all substantially as specified.

JOSEPH C. HEALD.

Witnesses:
T. W. PORTER,
A. C. FOWLER.